US007733381B2

(12) United States Patent
Shinkai et al.

(10) Patent No.: US 7,733,381 B2
(45) Date of Patent: Jun. 8, 2010

(54) IMAGE SENSING APPARATUS AND METHOD GENERATING ELECTRONIC MARK DATA BASED ON WHITE BALANCE DETECTIONS

(75) Inventors: Mitsutoshi Shinkai, Kanagawa (JP); Hiroaki Deguchi, Kanagawa (JP); Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 1115 days.

(21) Appl. No.: 11/208,616

(22) Filed: Aug. 23, 2005

(65) Prior Publication Data

US 2006/0044410 A1    Mar. 2, 2006

(30) Foreign Application Priority Data

Aug. 24, 2004    (JP)    ............................ P2004-243265

(51) Int. Cl.
*H04N 5/228*    (2006.01)
*H04N 9/73*    (2006.01)

(52) U.S. Cl. .................................. 348/223.1; 348/222.1
(58) Field of Classification Search ....... 348/222.1–241
See application file for complete search history.

(56) References Cited

U.S. PATENT DOCUMENTS

| | | | | |
|---|---|---|---|---|
| 7,075,569 B2 * | 7/2006 | Niikawa | ................... | 348/218.1 |
| 7,184,080 B2 * | 2/2007 | Kehtarnavaz et al. | .... | 348/223.1 |
| 7,295,213 B2 * | 11/2007 | Kim et al. | ................... | 345/589 |
| 7,436,439 B2 * | 10/2008 | Yuyama et al. | .......... | 348/223.1 |
| 7,453,598 B2 * | 11/2008 | Takahashi | ................... | 358/1.9 |

FOREIGN PATENT DOCUMENTS

| | | |
|---|---|---|
| JP | 7-99605 | 4/1995 |
| JP | 7-236115 | 9/1995 |
| JP | 10-290423 | 10/1998 |
| JP | 2003-299012 | 10/2003 |
| JP | 2004-180279 | 6/2004 |
| JP | 2004-328142 | 11/2004 |

\* cited by examiner

*Primary Examiner*—Jason Chan
*Assistant Examiner*—Pritham Prabhakher
(74) *Attorney, Agent, or Firm*—Oblon, Spivak, McClelland, Maier & Neustadt, L.L.P.

(57) ABSTRACT

An image sensing apparatus and method utilizing an image sensor, an auto white balance adjustment section, a change point detection section, and an electronic mark data generation section. The image sensor senses an image of an object and outputs an image signal corresponding to the image of the object. The auto white balance adjustment section automatically adjusts white balance of the image signal corresponding to a change of the image signal. The change point detection section detects a change point of the white balance corresponding to at least an adjustment value of the white balance while the image sensor is sensing the image of the object. The electronic mark data generation section generates electronic mark data for adjusted white balance based on time information of the change point detected by the change point detection section.

22 Claims, 9 Drawing Sheets

| | |
|---|---|
| _RecStart | RECORD START POSITION |
| _RecEnd | RECORD END POSITION |
| _ShotMark1 | ANY POSITION 1 |
| _ShotMark2 | ANY POSITION 2 |
| _Cut | CUT POSITION |
| _Flash | FLASH DETECTION POSITION |
| _FilterChange | LENS FILTER CHANGE POSITION |
| _ShutterSpeedChange | SHUTTER SPEED CHANGE POSITION |
| _GainChange | GAIN CHANGE POSITION |
| _WhiteBalanceChange | WHITE BALANCE CHANGE POSITION |
| _OverBrightness | POSITION AT WHICH VIDEO OUTPUT LEVEL EXCEEDS 100% |
| _OverAudioLimiter | POSITION AT WHICH AUDIO OUTPUT LEVEL EXCEEDS LIMIT VALUE |
| _In-XXX | MATERIAL CUT START POSITION |
| _Out-XXX | MATERIAL CUT END POSITION |
| _KeyFrame | POSITION OF REPRESENTATIVE FRAME OF MATERIAL |

*Fig. 5*

| KEY(16 BYTES) | L (1 BYTE) | VALUE(MAXIMUM OF 32 BYTES) |
|---|---|---|

Fig. 6

```xml
<?xml version="1.0" encoding="iso-8859-1"?>
<Takemetadata id="thisTake" no="1" status="OK">
    <Umid>060A2B340101010101010111...</Umid>
    <CreationTime isSummerTime="false">2002-10-01T12:34:56+09:00</CreationTime>
    <LastUpdate isSummerTime="false">2002-10-01T23:45:01+09:00</LastUpdate>
    <Duration>P10M20S15N30F</Duration>
    <Device>
        <Kind>IMX/DV Optical Camcorder</Kind>
        <Model name="ABC-0123" serialNo="12-34-56-78"/>
301     <SystemInfo board="AAA board 02/01" software="1.0"/>
        <FormatInfo>...</FormatInfo>
        <CameraSetting>...</CameraSetting>
    </Device>
    <ComponentMaterial>
        <Video src="video1.mxf"/>
        <Audio src="audio1.mxf"/>
        <Audio src="audio2.mxf"/>
        <Audio src="audio3.mxf"/>
302     <Audio src="audio4.mxf"/>
        <Aux src="aux1.bin"/>
        <MxfHeader src="mxfHeader1.bin"/>
        <SystemMetadata src="systemMetadata1.bin"/>
        <UserFrameMetadata src="userFrameMetadata1.bin"/>
    </ComponentMaterial>
    <Description>This is a first take captureed at my first work</Description>
    <EssenceMarkTable>
        <EssenceMark value="_Flash">60</EssenceMark>
        <EssenceMark value="_Flash">63</EssenceMark>
        <EssenceMark value="_OverAudioLimiter">65</EssenceMark>
        <EssenceMark value="_Flash">70</EssenceMark>
303     <EssenceMark value="_OverBrightness">73</EssenceMark>
        <EssenceMark value="_Flash">74</EssenceMark>
        <EssenceMark value="_In-001">57</EssenceMark>
        <EssenceMark value="_Out-001">64</EssenceMark>
    </EssenceMarkTable>
            .
            .
```

IMAGE SENSING APPARATUS AND METHOD GENERATING ELECTRONIC MARK DATA BASED ON WHITE BALANCE DETECTIONS

CROSS REFERENCES TO RELATED APPLICATIONS

The present invention contains subject matter related to Japanese Patent Application JP 2004-243265 filed in the Japanese Patent Office on Aug. 24, 2004, the entire contents of which are hereby incorporated herein by reference.

BACKGROUND OF THE INVENTION

1. Field of the Invention

The present invention relates to an image sensing apparatus, an image sensing method, an image sensing program, a recording apparatus, a recording method, and a recording program that allow both image signals of objects shot by a video camera and operation information thereof to be recorded.

2. Description of the Background Art

Image signals of objects shot by a video camera are recorded to a recording medium such as a video tape, a disc shaped recording medium, or a semiconductor memory. Thereafter, when necessary, the recorded image signals are edited and used. In brief, the editing operation is performed such that while the user is watching images reproduced as image signals from the recording medium, he or she extracts desired cuts and marks a start point, referred to as an in-point, and an end point, referred to as an out-point, each of the extracted cuts. Corresponding to the marked in-points and out-points, the user connects a plurality of cuts in his or her desired manner and records the connected images to for example another recording medium. As a result, so-called complete package images that are final images are obtained.

The user may need to extract his or her desired cuts, while he or she is watching images. Thus, to create perfect package images, the user may need to extract one or several cuts from many images. Thus, the user may have to reproduce many images, spending a long time.

To solve such a problem, a system that extracts feature points from images, searches images for the feature points, and extracts desired cuts has been proposed. As feature points, change points of operation states of the video camera can be used. When operation states of the video camera, for example diaphragm, zoom, focus, white balance, amplifier gain, and shutter speed have changed, the object or the shooting environment likely changed or the user likely intentionally operated the video camera. Thus, these change points can be used as feature points of images.

In particular, it is thought that a change point of an auto tracking white balance (ATW) that causes a white balance control to automatically follow a surrounding color temperature corresponds to a large change of a shooting environment such as a shooting location change from outdoor to indoor (or from indoor to outdoor), from room to room (e.g., from a room with an incandescent lamp to a room with a fluorescent lamp). Thus, change points of the auto tracking white balance are very effective to extract cuts.

Japanese Patent Laid-Open Publication No. 9-198849 describes a structure of a video camera that obtains changes of its operation states when it shoots objects and records the obtained changes as camera operation information together with image signals to a recording medium. According to JP 9-198849, when the user shoots objects, the video camera obtains camera operation information and records the information together with image signals to a recording medium frame by frame. When the user edits images, he or she searches for them corresponding to the camera operation information frame by frame. With the structure described in JP 9-198849, the user can quickly search his or her desired scenes corresponding to the camera operation states.

SUMMARY OF THE INVENTION

With the structure disclosed in JP 9-198849, since camera operation information is obtained and recorded frame by frame, the recording capacity of the recording medium needs to be increased. This leads to a problem when many kinds of camera operation information are obtained and recorded.

In addition, to search for scenes corresponding to camera operation information, it may be needed to determine whether concerned items of camera operation information exceed their threshold values. With the structure disclosed in JP 9-198849, when the user edits images, he or she may need to search camera operation information to determine whether concerned items of camera operation information exceed their threshold values, spending a long processing time.

In view of the foregoing, it would be desirable to provide an image sensing apparatus, an image sensing method, an image sensing program, a recording apparatus, a recording method, and a recording program that allow desired cuts to be quickly searched when images are edited and allows a recording medium to be effectively used.

An embodiment of the present invention is an image sensing apparatus that has an image sensor, an auto white balance adjustment section, a change point detection section, and an electronic mark data generation section. The image sensor senses an image of an object and outputs an image signal corresponding to the image of the object. The auto white balance adjustment section automatically adjusts white balance of the image signal corresponding to a change of the image signal. The change point detection section detects a change point of the white balance corresponding to at least an adjustment value of the white balance while the image sensor is sensing the image of the object. The electronic mark data generation section generates electronic mark data for adjusted white balance based on time information of the change point detected by the change point detection section.

An embodiment of the present invention is an image sensing method. An image of an object is sensed. An image signal is output corresponding to the image of the object. White balance of the image signal is automatically adjusted corresponding to a change of the image signal. A change point of the white balance is detected corresponding to at least an adjustment value of the white balance while the image of the object is being sensed. Electronic mark data for adjusted white balance is generated based on time information of the change point detected.

An embodiment of the present invention is an image sensing program that causes a microprocessor to execute an image sensing method. An image of an object is sensed. An image signal is output corresponding to the image of the object. White balance of the image signal is automatically adjusted corresponding to a change of the image signal. A change point of the white balance is detected corresponding to at least an adjustment value of the white balance while the image of the object is being sensed. Electronic mark data for adjusted white balance are generated based on time information of the change point detected.

An embodiment of the present invention is a recording apparatus that has an image sensor, an auto white balance adjustment section, a change point detection section, an electronic mark data generation section, and a recording section. The image sensor senses an image of an object and outputs an image signal corresponding to the image of the object. The auto white balance adjustment section automatically adjusts white balance of the image signal corresponding to a change of the image signal. The change point detection section detects a change point of the white balance corresponding to at least an adjustment value of the white balance while the image sensor is sensing the image of the object. The electronic mark data generation section generates electronic mark data for adjusted white balance based on time information of the change point detected by the change point detection section. The recording section records the image signal whose white balance has been adjusted by the white balance adjustment section to a recording medium.

An embodiment of the present invention is a recording method. An image of an object is sensed. An image signal is output corresponding to the image of the object. White balance of the image signal is automatically adjusted corresponding to a change of the image signal. A change point of the white balance is detected corresponding to at least an adjustment value of the white balance while the image of the object is being sensed. Electronic mark data for adjusted white balance is generated based on time information of the change point detected. The image signal whose white balance has been adjusted is recorded to a recording medium.

An embodiment of the present invention is a recording program that causes a microprocessor to execute a recording method. An image of an object is sensed. An image signal is output corresponding to the image of the object. White balance of the image signal is automatically adjusted corresponding to a change of the image signal. A change point of the white balance is detected corresponding to at least an adjustment value of the white balance while the image of the object is being sensed. Electronic mark data for adjusted white balance are generated based on time information of the change point detected. The image signal whose white balance has been adjusted is recorded to a recording medium.

As described above, according to an embodiment of the present invention, the white balance of an image signal of an object that is shot is automatically adjusted corresponding to a change of the image signal. While an object is being shot, a change point of the white balance is detected corresponding to an adjustment value of the white balance. With time information for the detected change point, electronic mark data for the adjusted white balance are generated. Thus, when an image signal is recorded to a recording medium and the image signal is reproduced and edited, with the electronic mark data, scenes in which shooting environment and objects changed and the camera user changed his or her mind can be quickly searched.

In addition, according to an embodiment of the present invention, the white balance of an image signal of an object that is shot is automatically adjusted corresponding to a change of the image signal. While an object is being shot, a change point of the white balance is detected corresponding to an adjustment value of the white balance. With time information for the detected change point, electronic mark data for the adjusted white balance are generated. The image signal whose white balance was adjusted is recorded to a recording medium. Thus, when the image signal recorded on the recording medium is reproduced and edited, with the electronic mark data, scenes in which shooting environment and objects changed and the camera user changed his or her mind can be quickly searched.

According to an embodiment of the present invention, user's operations for the video camera device and changes of operation information of the video camera device are affected by changes of objects and the change of the mind of the camera user. Thus, when these information and digital image signal are correlatively recorded, desired images can be quickly and easily searched and reproduced.

In addition, since user's operations and changes of operation information of the video camera device are automatically recorded, the effect of a quick and easy search for desired images can be accomplished without needing to impose a special shooting operation on the user.

When an image signal is recorded, user's operations and changes of operation information of the video camera device are detected. The detected change and time information for the changes are correlatively recorded. Thus, the amount of record information is small.

In addition, according to an embodiment of the present invention, an auto tracking white balance operation is detected and recorded as a change of operation information of the video camera device. Thus, when an image signal is reproduced, the user can easily know whether scenes were shot indoor or outdoor. Thus, desired scenes can be quickly searched.

In addition, when the operation of the auto tracking white balance is detected, since changes of shutter speed, gain adjustment, and filter selection are considered, even if they offset a change of the white balance itself, changes of color temperature of an object that is shot can be recorded.

These and other objects, features and advantages of the present invention will become more apparent in light of the following detailed description of a best mode embodiment thereof, as illustrated in the accompanying drawings.

BRIEF DESCRIPTION OF THE DRAWINGS

The invention will become more fully understood from the following detailed description, taken in conjunction with the accompanying drawings, wherein similar reference numerals denote similar elements, in which.

DETAILED DESCRIPTION OF THE PREFERRED EMBODIMENTS

Next, an embodiment of the present invention will be described. According to the embodiment of the present invention, when a video camera device shoots objects, it detects change points of its operation states and correlatively records the change points and time information thereof. When a digital image signal recorded by the video camera device is edited, with information of change points of operation states of the video camera device, points at which the brightness of objects and shooting environments have largely changed and points at which the camera user changed his or her mind can be easily searched. Thus, the user can effectively perform editing operations.

Figure 1:
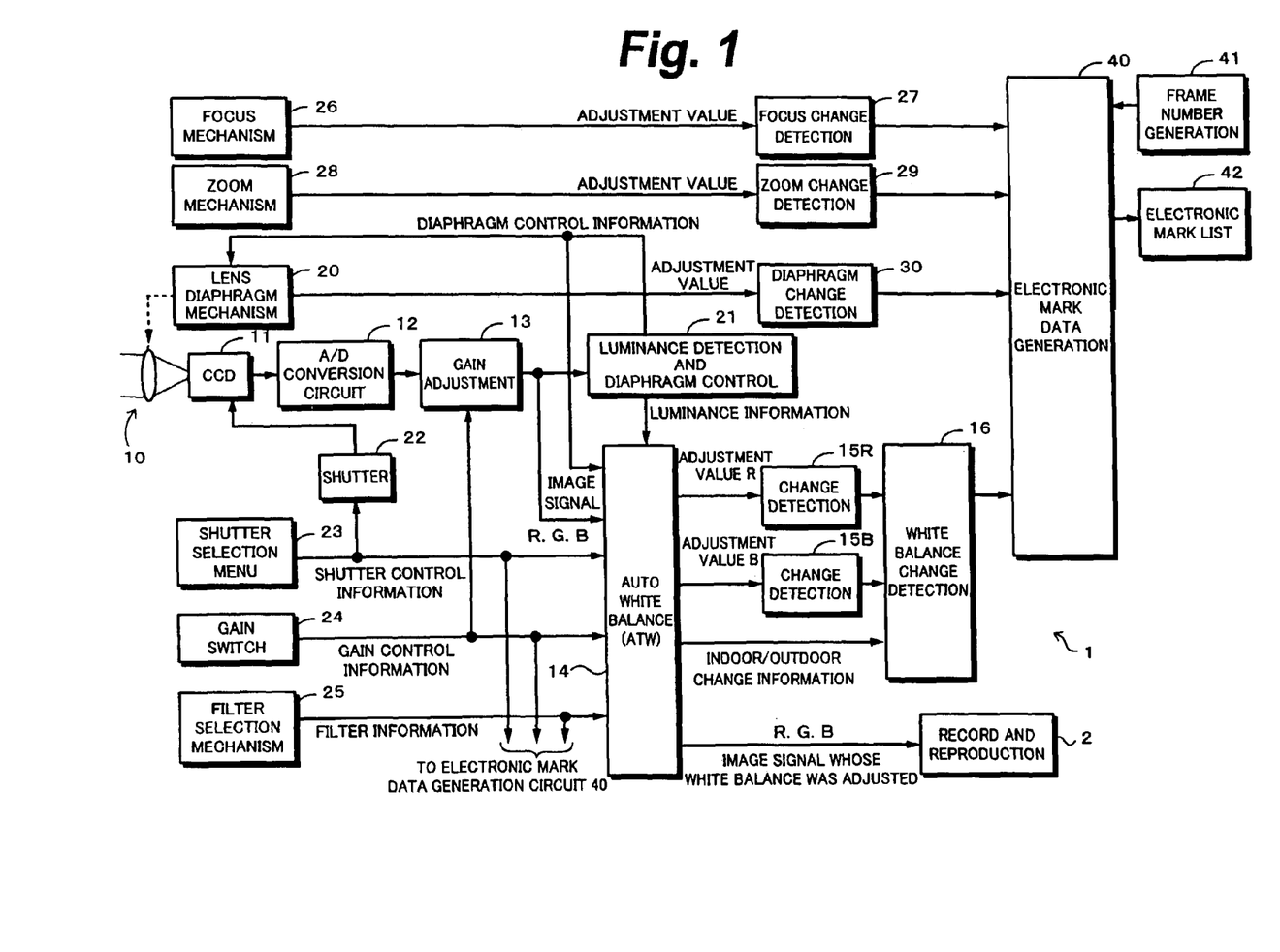
FIG. 1 is a block diagram showing an example of the structure of a video camera device according to an embodiment of the present invention.

FIG. 1 shows an example of the structure of a video camera device 1 according to an embodiment of the present invention. The video camera device 1 has a control device that generates predetermined control signals corresponding to a program. The control device has a microprocessor such as a central processing unit (CPU), a random access memory (RAM), a read only memory (ROM), and a bus that connects these devices. The CPU generates various types of control signals and so forth corresponding to programs and data that are pre-stored in the ROM. The RAM is used as a work memory for the CPU. Each portion of the video camera device 1 is controlled by the control device.

Light emitted from an object enters a charge coupled device (CCD) 11 that is an image sensor. The image sensor is not limited to a CCD, but can also be formed of any other image sensor such as a CMOS sensor, or similar device. The CCD 11 stores electric charges of individual pixels corresponding to incident light. The CCD 11 converts the stored electric charges into an electric signal and outputs the electric signal. At this point, a shutter 22 controls a storage time (shutter speed) of electric charges to the CCD 11 to a constant time for each field. The storage time of electric charges for each field is controlled with shutter control information generated corresponding to a shutter speed that the user selects on a shutter selection menu 23. The shutter control information is supplied to both the shutter 22 and an auto white balance circuit 14.

The video camera device 1 according to the embodiment of the present invention uses the so-called three-panel system that has three CCDs in the CCD 11 corresponding to R (red), G (green), and B (blue). In the following description, unless otherwise specified, an image signal is composed of three image signals of colors R, G, and B.

An image signal that is output from the CCD 11 is supplied to an A/D conversion circuit 12. The A/D conversion circuit 12 converts the image signal into a digital image signal. The digital image signal is supplied to a gain adjustment circuit 13. The gain adjustment circuit 13 sets a gain of the digital image signal corresponding to gain control information. The gain adjustment circuit 13 supplies the digital image signal to an auto white balance circuit 14 and a luminance detection and diaphragm control circuit 21. The gain control information is generated corresponding to an operation of a gain switch 24 that is one of switches of a user interface of the video camera device 1. The gain control information is also supplied to the auto white balance circuit 14.

The luminance detection and diaphragm control circuit 21 obtains the luminance of the digital image signal corresponding to a luminance component thereof. The obtained luminance information is supplied to the auto white balance circuit 14. The luminance detection and diaphragm control circuit 21 generates a diaphragm control signal with which the diaphragm of an optical system 10 is controlled with the obtained luminance information. The diaphragm control information is supplied to a lens diaphragm mechanism 20. The lens diaphragm mechanism 20 adjusts the diaphragm of the optical system 10 corresponding to the supplied diaphragm control information so that the amount of incident light of the CCD 11 becomes a predetermined amount.

Disposed on the light incident side of the optical system 10 is an optical filter mechanism that has a plurality of optical filters. The optical filter mechanism includes a plurality of optical filters that gradually decrease the amount of incident light of the optical system 10 and a plurality of optical filters that compensate color temperature of incident light. The optical filter mechanism selects one from the plurality of optical filters corresponding to a user's operation in a filter selection mechanism 25. Filter selection information that is output from the filter selection mechanism 25 is supplied as filter information to the auto white balance circuit 14.

The auto white balance circuit 14 adjusts the white balance of the input digital image signals of R, G, and B. The auto white balance circuit 14 outputs digital image signals of R, G, and B that have been white balanced. The auto white balance circuit 14 performs a so-called auto tracking white balance operation that causes the input digital image signals to be automatically white balanced corresponding to the changes thereof.

Next, the white balance will be described in brief. First of all, color temperature will be described. Color temperature is a color of light emitted from a perfect black body that is heated. The color of the perfect black body and temperature thereof are correlatively defined with a relationship of 1 to 1. The temperature necessary to radiate the perfect black body with light of a color is the unit of color temperature. The color temperature is represented by "K" (Kelvin), which is the unit of thermodynamic temperature. The color of light emitted from the perfect black body varies from red to white to blue as the temperature rises. Thus, a totally reddish screen can be called "low color temperature," whereas a totally bluish screen can be called "high color temperature." The color temperature of a 60 W tungsten incandescent lamp as a regular light source is around 2800 K. The color temperature of noon sunlight is around 5600 K. The color temperature of a daylight color fluorescent lamp is around 6500 K.

White balance, which is one of adjustment functions of a video camera and so forth, is a function that adjusts the balance of colors of red (R), green (G), and blue (B) so that a white object is shot as an unbiased white image under a light source of particular color temperature.

When the white balance of the video camera is adjusted under a light source of low color temperature, for example a 60 W tungsten incandescent lamp, a white object is shot as an white image. However, if the same object is shot with a light source of higher color temperature such as noon sunlight with the same white balance setting, the white object is shot as a bluish image. Thus, when an object is shot with a light source of different color temperature, it is necessary to adjust the white balance.

Figure 2:
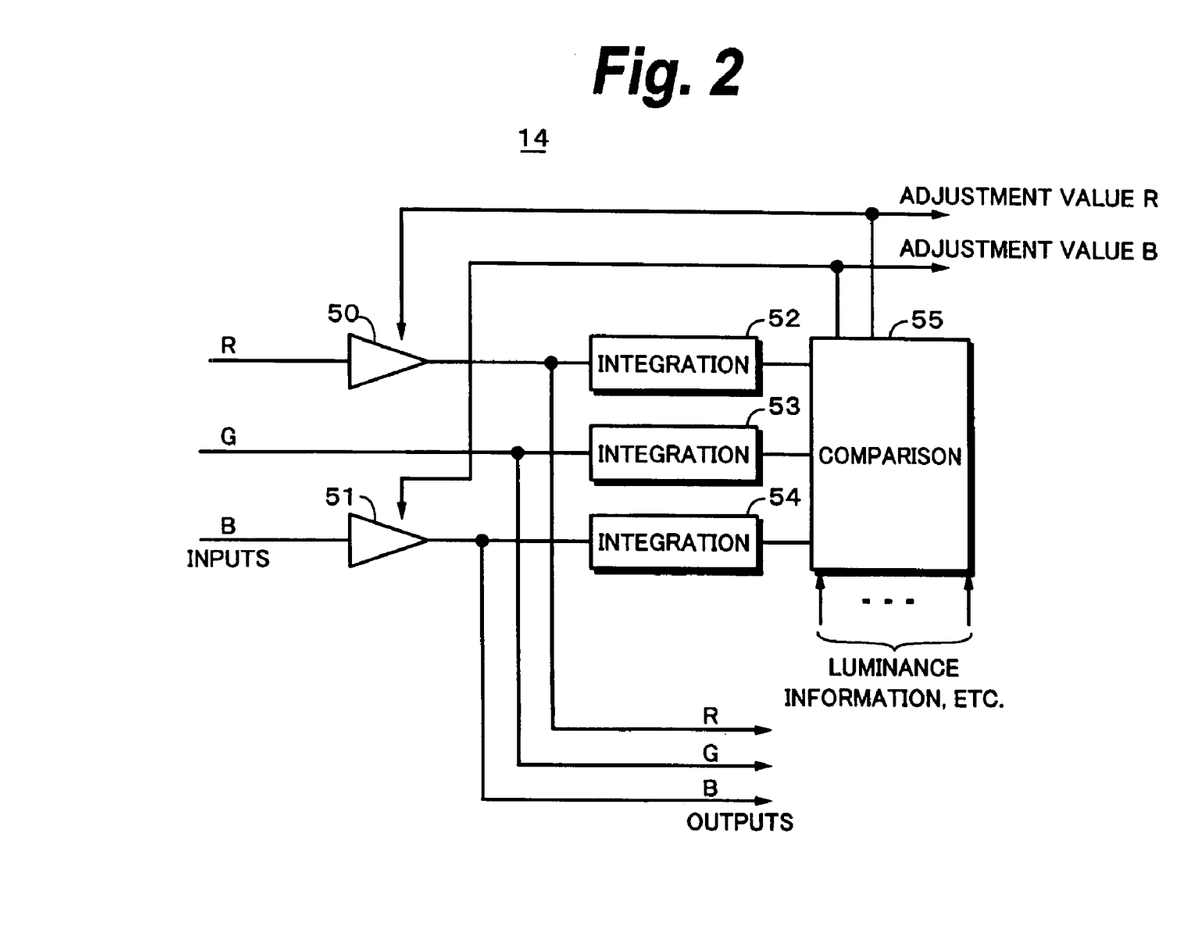
FIG. 2 is a block diagram showing an example of the structure of an auto white balance circuit.

FIG. 2 shows an example of the structure of the auto white balance circuit 14. In the following description, a red (R) digital image signal is referred to as an R signal. This also applies to green (G) and blue (B) digital image signals. The R signal of the R signal, G signal, and B signal that are input to the auto white balance circuit 14 is supplied to an integration circuit 52 through a variable gain amplifier 50. The G signal is supplied to an integration circuit 53. The B signal is supplied to an integration circuit 54 through a variable gain circuit 51.

The integration circuits 52, 53, and 54 integrate R, G, and B signals for one screen each and output the resultant signals. Outputs of the integration circuits 52, 53, and 54 are supplied to a comparison circuit 55. The comparison circuit 55 compares the levels of the R, G, and B signals integrated for one screen each. The gains of the amplifiers 50 and 51 are adjusted so that the levels of the R signal, G signal, and B signal become identical. In other words, by adjusting the gains of the amplifier 50 and the amplifier 51, the levels of the R signal and B signal are relatively varied compared to the level of the G signal so that the levels of the R, G, and B signals become identical. In this manner, the white balance is adjusted. The auto white balance circuit 14 performs this process for each field or at predetermined intervals so as to follow up the white balance adjustment operation for changes of the R, G, and B signals.

A digital image signal that is output from the auto white balance circuit 14 is obtained from input sides of the integration circuits 52, 53, and 54. An adjustment value R and an adjustment value B are output with which the gains of the variable gain amplifiers 50 and 51 are adjusted corresponding to the compared result of the comparison circuit 55.

In addition, the auto white balance circuit 14 obtains brightness information of the digital image signal with the luminance information and diaphragm control information supplied from the luminance detection and diaphragm control circuit 21, the shutter control information supplied from the shutter selection menu 23, the gain control information supplied from a gain switch 24, and the filter information supplied from the filter selection mechanism 25. The auto white balance circuit 14 controls the follow-up speed of the white balance adjustment against the changes of the digital image signals corresponding to the brightness information.

In other words, if the brightness of an object has sharply varied, for example if the shooting location has been changed from indoor to outdoor or from outdoor to indoor, the follow-up speed of the auto tracking white balance is increased so as to deal with the sharp change of the color temperature of the object. When it has been determined that the auto tracking white balance operation has caused the white balance adjustment to converge, the follow-up speed of the auto tracking white balance operation is decreased.

For example, if the shooting location is changed from outdoor to indoor in the daytime, the indoor is much darker than the outdoor in the daytime. The light amount of the indoor is much smaller than the light amount of the outdoor. Thus, when the shooting location is changed from indoor to outdoor, luminance information may largely vary. If the luminance information largely varies, the luminance detection and diaphragm control circuit 21 generates diaphragm control information that causes the diaphragm to decrease the change of the luminance information. In this case, depending on the shooting conditions and so forth, the user may increase the shutter speed, decrease the gain of the gain adjustment circuit 13 with the gain switch 24, and select a high attenuation filter with the filter selection mechanism 25. Thus, when the brightness of the object largely varies, the luminance information, diaphragm control information, shutter control information, gain control information, and/or filter information also vary.

Occasionally, when moving the shooting location from indoor to outdoor, the camera user may for example adjust the shutter speed, adjust the gain, and select a filter. In this case, since the luminance signal does not largely vary, the diaphragm control information does not largely vary. However, since the shutter control information, gain control information, and/or filter information vary, it can be used to determine whether the shooting location is indoor or outdoor.

The changes of the diaphragm control information, shutter control information, gain control information, and filter information can be correlated with the change of the brightness of the object. These items of information can be used to indicate that the brightness of the object has varied.

For example, the luminance information, diaphragm control information, shutter control information, gain control information, and filter information are supplied to the comparison circuit 55. The comparison circuit 55 determines whether supplied values exceed their threshold values. When one of the values exceeds the corresponding threshold value, it is determined that the brightness of the object has largely varied and the shooting location has been changed from indoor to outdoor (or from outdoor to indoor). Alternatively, when the values of a plurality of items of information exceed their threshold values, it may be determined that the shooting location has been changed from indoor to outdoor (or from outdoor to indoor).

When it has been determined that the shooting location had been changed from indoor to outdoor (or from outdoor to indoor), the adjustment value R and the adjustment value B supplied to the amplifiers 50 and 51 are controlled so that the time constant of a feedback loop composed of the amplifier 50 and/or 51 and the comparison circuit 55 decreases and the follow-up speed of the auto tracking white balance increases. The comparison circuit 55 monitors outputs of the integration circuits 52, 53, and 54. When the changes of the outputs become equal to or smaller than their threshold values, it is determined that the white balance adjustment has been converged. At this point, the adjustment values R and B are controlled so that the time constant of the feedback loop increases and the follow-up speed of the auto tracking white balance operation decreases.

Returning to FIG. 1, the R, G, and B digital image signals that are output from the auto white balance circuit 14 are sent to a recording and reproducing portion 2. The recording and reproducing portion 2 may be integrated with the video camera device 1. Alternatively, the recording and reproducing portion 2 may be independent from the video camera device 1 connected thereto with a cable.

Figure 3:
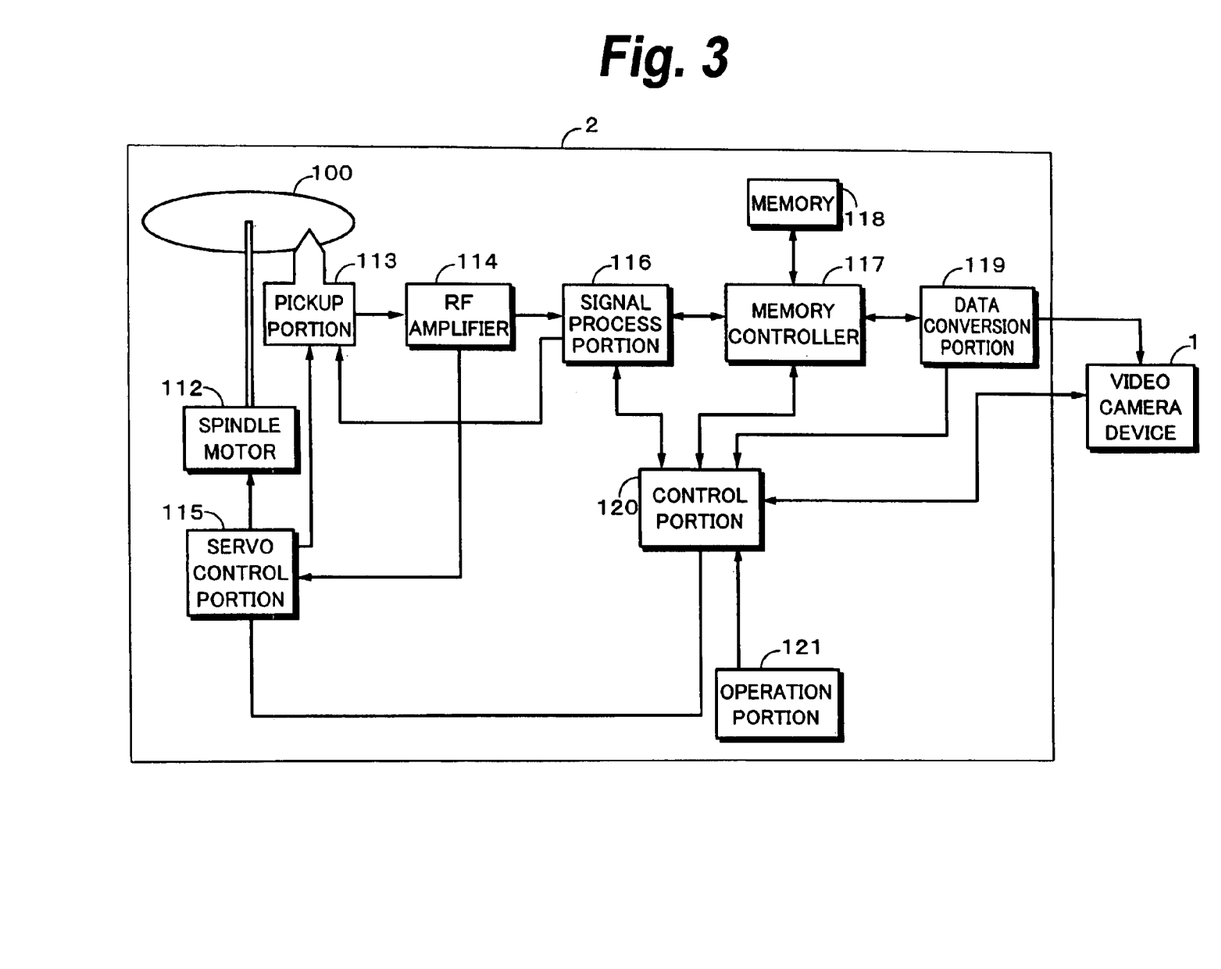
FIG. 3 is a block diagram showing an example of the structure of a recording and reproducing portion.

FIG. 3 shows an example of the structure of the recording and reproducing portion 2. A spindle motor 112 drives the rotations of an optical disc 100 at constant linear velocity (CLV) or constant angular velocity (CAV) corresponding to a spindle motor drive signal received from a servo control portion 115.

A pickup portion 113 controls an output of laser light corresponding to a record signal supplied from a signal process portion 116 and records the record signal to the optical disc 100. The pickup portion 113 focuses laser light on the optical disc 100. In addition, the pickup portion 113 converts light reflected from the optical disc 100 into electricity, generates a current signal, and supplies the current signal to a radio frequency (RF) amplifier 114. A predetermined position is radiated with the laser light corresponding to a servo signal supplied from the servo control portion 115 to the pickup portion 113.

The RF amplifier 114 generates a focus error signal, a tracking error signal, and a reproduction signal corresponding to the current signal supplied from the pickup portion 113. The tracking error signal and the focus error signal are supplied to the servo control portion 115. The reproduction signal is supplied to the signal process portion 116.

The servo control portion 115 controls the focus servo operation and the tracking servo operation. In reality, the servo control portion 115 generates a focus servo signal and a tracking servo signal corresponding to the focus error signal and the tracking error signal supplied from the RF amplifier 114 and supplies the generated signals to respective actuators (not shown) of the pickup portion 113. The servo control portion 115 generates a spindle motor drive signal with which the spindle motor 112 is driven and controls the spindle servo operation that rotates the optical disc 100 at a predetermined rotation speed.

In addition, the servo control portion 115 performs a thread control that radially moves the video camera device 1 and changes the radiation position of laser light. The signal read position of the optical disc 100 is set by a control portion 120. The control portion 120 controls the position of the pickup portion 113 to read the signal from the preset read position.

The signal process portion 116 modulates record data that are input from a memory controller 117, generates a record signal, and supplies the record signal to the pickup portion 113. The signal process portion 116 demodulates a reproduction signal supplied from the RF amplifier 114, generates reproduction data, and supplies the reproduction data to the memory controller 117.

The memory controller 117 stores record data supplied from a data conversion portion 119 to a memory 118, reads the record data therefrom, and supplies the record data to the signal process portion 116. In addition, the memory controller 117 stores reproduction data supplied from the signal process portion 116 to the memory 118, reads the reproduction data therefrom, and supplies the reproduction data to the data conversion portion 119.

A digital image signal that is output from the video camera device 1 is supplied to the data conversion portion 119. The video camera device 1 collects sound with a microphone (not shown), converts the sound into a digital audio signal, and outputs the digital audio signal. The digital audio signal is sent from the video camera device 1 to the recording and reproducing portion 2. The digital audio signal is supplied to the data conversion portion 119.

The data conversion portion 119 compression-encodes the supplied digital image signal in a mode designated by the control portion 120 corresponding to a compression encoding system such as the MPEG2 system and generates a record digital image signal. In addition, the data conversion portion 119 compression-encodes the supplied digital audio signal in a system designated by the control portion 120 and outputs the encoded signal as a record digital audio signal. The digital audio signal may not be compression-encoded, but may be directly output as a linear pulse code modulation (PCM) digital audio signal.

The record digital image signal and the record digital audio signal that are processed by the data conversion portion 119 are supplied to the memory controller 117.

When necessary, the data conversion portion 119 decodes the reproduction digital image signal and reproduction digital audio signal supplied from the memory controller 117, converts them into predetermined format signals, and outputs the converted signals.

The control portion 120 is composed of a CPU, memories such as a ROM and a RAM, and a bus that connects these devices. The control portion 120 controls the entire recording and reproducing portion 2. When the recording and reproducing portion 2 is integrated with the foregoing video camera device 1, a control portion (not shown) of the video camera device 1 and the control portion 120 may be used in common. The ROM pre-stores an initial program that is read when the CPU gets started and a program and so forth with which the recording and reproducing portion 2 is controlled. The RAM is used as a work memory of the CPU. The control portion 120 controls the video camera portion.

In addition, the control portion 120 provides a file system that records data to the optical disc 100 corresponding to a program that is pre-stored in the ROM and reproduces the record data from the optical disc 100. In other words, the recording and reproducing portion 2 records data to the optical disc 100 and reproduces data therefrom under the control of the control portion 120.

An operation portion 121 is operated by the user. The operation portion 121 supplies an operation signal corresponding to a user's operation to the control portion 120. The control portion 120 controls the servo control portion 115, the signal process portion 116, the memory controller 117, and the data conversion portion 119 corresponding to the operation signal and so forth supplied from the operation portion 121 to cause these devices to execute the recording and reproducing processes.

In addition, the control portion 120 sets bit rate, frame rate, picture size, and picture aspect ratio of, for example, the record digital image signal corresponding to the operation signal supplied from the operation portion 121. In addition, the ON/OFF of the compression encoding process for the record audio data and setting of bit resolution may be performed by the operation portion 121. Control signals corresponding to these settings are supplied to the memory controller 117 and the data conversion portion 119.

Next, generation and recording of electronic mark data according to an embodiment of the present invention will be described. The video camera device 1 according to the embodiment of the present invention detects various operations that the video camera device 1 performs to shoot an object and record camera operation information that represents the various operations as electronic mark data to a recording medium.

Referring to FIG. 1, a focus change detection circuit 27 determines whether the focus adjustment value of a focus mechanism 26 exceeds a predetermined threshold value and detects a focus change point. For example, the focus change detection circuit 27 differentiates the focus adjustment value and determines whether the differentiated value exceeds a predetermined threshold value. When the focus adjustment value exceeds the predetermined threshold value, the focus change detection circuit 27 supplies a pulse as a detection result to an electronic mark data generation circuit 40. The electronic mark data generation circuit 40 generates an electronic mark that represents the supplied detection result, correlates the electronic mark with time information, and describes the correlated data to an electronic mark list 42. The electronic mark list 42 is stored in a RAM as a work memory of a CPU (not shown).

According to this embodiment of the present invention, time information is generated corresponding to frame numbers generated by a frame number generation circuit 41. In other words, the frame number generation circuit 41 generates frame numbers of a digital image signal of an image of an object which the video camera device 1 is shooting. When the frame numbers are used as time information corresponding to electronic mark data, the relationship between electronic mark data and a digital image signal can be easily obtained. Time information is not limited to frame numbers, but information that represents real time can also be used. Alternatively, time codes defined in the Society of Motion Picture and Television Engineers (SMPTE) may be used. Alternatively, original time information may be used.

This mechanism can be applied to other types of change points. A zoom change detection circuit 29 determines whether the zoom adjustment value of a zoom mechanism 28 exceeds a predetermined threshold value. When the zoom adjustment value exceeds the predetermined threshold value, the zoom change detection circuit 29 detects a zoom change point. The detection result of the zoom change detection circuit 29 is supplied to the electronic mark data generation circuit 40. The electronic mark data generation circuit 40 correlates the detection result with time information and describes the correlated data to the electronic mark list 42. A diaphragm change detection circuit 30 determines whether the diaphragm adjustment value of the lens diaphragm mechanism 20 exceeds a predetermined threshold value. When the diaphragm adjustment value exceeds the predetermined value, the diaphragm change detection circuit 30 detects a diaphragm change value. The detection result of the diaphragm change detection circuit 30 is supplied to the electronic mark data generation circuit 40. The electronic mark data generation circuit 40 correlates the detection result with time information and describes the correlated data to the electronic mark list 42.

Change detection circuits 15R and 15L determine whether the adjustment values R and B of white balance adjustment results of the auto white balance circuit 14 exceed their threshold values and detect change points of the adjustment values R and L. The detection results of the change points of the adjustment values R and B are supplied to a white balance change detection circuit 16.

On the other hand, as described above, the auto white balance circuit 14 checks the change of the brightness of the object with the luminance information, diaphragm control information, shutter control information, gain control information, and filter control information and detects whether the shooting location has been changed from indoor to outdoor (or from outdoor to indoor). The auto white balance circuit 14 controls the follow-up speed for the white balance adjustment against the digital image signal corresponding to the detection result. Indoor/outdoor change information of the detection result is supplied to the white balance change detection circuit 16.

When the white balance change detection circuit 16 has detected any change with the change detection result of the change detection circuit 15R, the change point detection result of the change detection circuit 15B, and the indoor/outdoor change information supplied from the auto white balance circuit 14, the white balance change detection circuit 16 determines that the white balance has changed and supplies the detection results to the electronic mark data generation circuit 40.

In other words, when the shutter speed, the gain of the gain adjustment circuit 13, or the filter has been changed, as described above, it can be considered that the shooting location has been changed from indoor to outdoor (or from outdoor to indoor). It can be thought that the color temperature has changed under these conditions. At this point, if the shutter speed, gain, or filter is changed corresponding to the change of the color temperature, the change of the color temperature of the object is offset with the change of the shutter speed, gain, or filter. Thus, there is a possibility the auto white balance circuit 14 cannot detect the white balance corresponding to the R signal, the G signal, and the B signal. Thus, according to the embodiment, when it has been detected that the shutter speed, the gain, or the filter has changed, it is considered that the shooting location has been changed from indoor to outdoor (or from outdoor to indoor). Thus, it is considered that the change of the white balance has been detected.

The electronic mark data generation circuit 40 correlates the supplied white balance change detection results with time information and describes the correlated data to the electronic mark list 42.

Detection circuits (not shown) determine whether the shutter control information, the gain control information, and the filter information exceed predetermined threshold values and detect change points. The detection results are supplied to the electronic mark data generation circuit 40. The electronic mark data generation circuit 40 correlates the detection results with time information and describes the correlated data to the electronic mark list 42.

When a clip of a digital image signal of an image of an object that was shot is recorded to the optical disc 100 by the recording and reproducing portion 2, the electronic mark list 42 is stored in one Take Meta Data File corresponding to the clip and recorded to the optical disc 100. In this example, a clip is a group of data after a shooting operation is started until it is stopped. For example, one clip is composed of a digital image signal (and a digital audio signal) that are input after a start button (not shown) is pressed until a stop button (not shown) is pressed (or the start button is released).

A Take Meta Data File is a file that contains at least one unit of electronic mark data that are generated when one clip is shot. Meta data are more highly ranked data than regular data and function as an index that represents the contents of various types of data. A Take Meta Data File is meta data that represent an index of content data (digital image signal and digital audio signal) for each clip.

A digital image signal (and a digital audio signal) that compose a clip are supplied from the video camera device 1 to the recording and reproducing portion 2 and supplied to the data conversion portion 119. In addition, the Take Meta Data File is output from the video camera device 1 and supplied to, for example, the control portion 120 of the recording and reproducing portion 2. The control portion 120 supplies the Take Meta Data File to the memory controller 117. At proper timings, the memory controller 117 stores the Take Meta Data File to the memory 118, reads it therefrom, and supplies it as record data to the signal process portion 116.

A Take Meta Data File and a clip may be recorded to the same recording medium by the recording and reproducing portion 2. Alternatively, a Take Meta Data File and a clip may be recorded or stored to different recording mediums. In other words, a clip may be recoded to the optical disc 100 by the recording and reproducing portion 2, whereas a Take Meta Data File may be stored in a detachable non-volatile semiconductor memory such as a flash memory attached to the video camera device 1.

Figure 4:
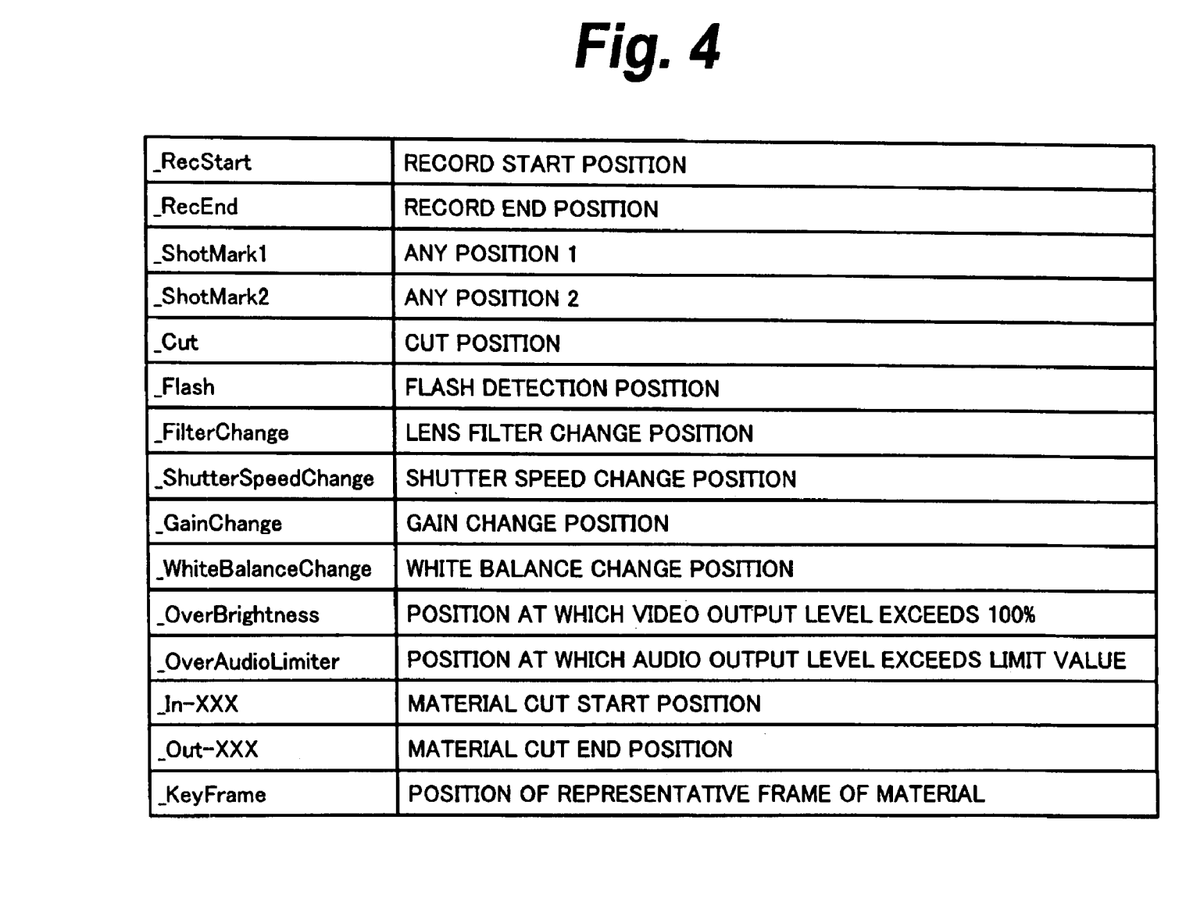
FIG. 4 is a schematic diagram showing examples of reserved words that define electronic mark data.

Next, take meta data will be described in detail. FIG. 4 shows examples of reserved words that define electronic mark data. Electronic mark data defined with reserved words shown in FIG. 4 can be described in a Take Meta Data File. Each item name of electronic mark data is composed of an underscore "_" and a character string that represents the content of the item, for example, "Flash," "WhiteBalanceChange," or the like. Besides those shown in FIG. 4, other electronic mark data can be additionally defined. Rules of reserved words that define electronic mark data are not limited to those examples.

"_RecStart" is a shooting start mark that represents a record start position. "_RecEnd" is a shooting end mark that represents a record end position. "_ShotMark1" and "_ShotMark2" are shot marks that represent any position such as a noticeable time point. "_Cut" is a cut mark that represents a cut position. "_Flash" is a flash mark that represents a flash detection position.

"_FilterChange" is a filter change mark that represents the position at which a lens filter of the image sensing apparatus was changed. "_FilterChange" corresponds to a detected result of a change point of the foregoing filter information. "_ShutterSpeedChange" is a shutter speed change mark that represents the position at which the shutter speed of the image sensing apparatus was changed. "_ShutterSpeedChange" corresponds to a detection result of a change point of the above-described shutter control information. "_GainChange" is a gain change mark that represents the position at which the gain was changed. "_GainChange" corresponds to a detection result of a change point of the above-described filter control information. "_WhiteBalanceChange" is a white balance change mark that represents a position at which white balance was changed. "_WhiteBalanceChange" corresponds to a detection result of a change point of the above-described white balance.

"_FilterChange," "_ShutterSpeedChange," and "_GainChange" may be described independently or converted as indoor/outdoor change information into "_WhiteBalanceChange." Alternatively, these independent marks and their converted marks may be described in combination.

"_OverBrightness" is a mark that represents the position at which the output level of an image signal exceeds a limit value. "_OverAudioLimiter" is a large sound volume mark that represents the position at which the output level of an audio signal exceeds a limit value. In marks from "_FilterChange" to "_OverAudioLimiter," a change that takes place while a digital image signal is being recorded is considered.

"_In-XXX" is an edit start mark that represents the cut start position of a cut or a material. "_Out-XXX" is an edit end mark that represents the cut end position of a cut or a material. Whenever the edit start point (in-point) and the edit end point (out-point) are added, a number or an alphabetic character is sequentially numbered in the portion "XXX" such as "_In-001," "_In-002," and so forth. "_KeyFrame" is a key frame mark that represents the position of a representative frame of a material.

Since the above-defined electronic mark data are used as index information when video data are roughly edited, desired video scenes can be effectively selected.

Figure 5:
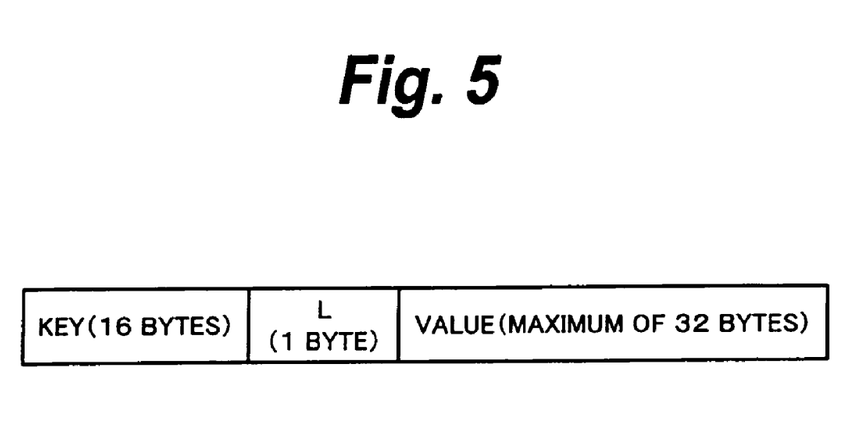
FIG. 5 is a schematic diagram showing an example of the data structure of electronic mark data.

FIG. 5 shows an example of the data structure of electronic mark data. As described in FIG. 4, electronic mark data are meta data in which features of video scenes are represented with text data and correlated with a digital image signal. Electronic mark data are encoded with the key length value (KLV) system and can be recorded and transmitted in for example the serial data interface (SPI). FIG. 5 shows the format of electronic mark data that have been KLV encoded. This format is based on the SMPTE 335M/RP210A meta data dictionary.

Electronic mark data that have been KLV encoded have a "key" portion of 16 bytes long, an "L (length)" portion of one byte long, and a "Value" portion of a maximum of 32 bytes long. The "Key" portion is an identifier that represents a data item that has been KLV encoded on the basis of the SMPTE 335M/RP210A. In this example, the "Key" portion is a value that represents electronic mark data. The "L" portion represents the data length after the "L"portion in bytes. The "L" portion can represent the data length of a maximum of 32 bytes. The "Value" portion is an area of text data for electronic mark data.

Figure 6:
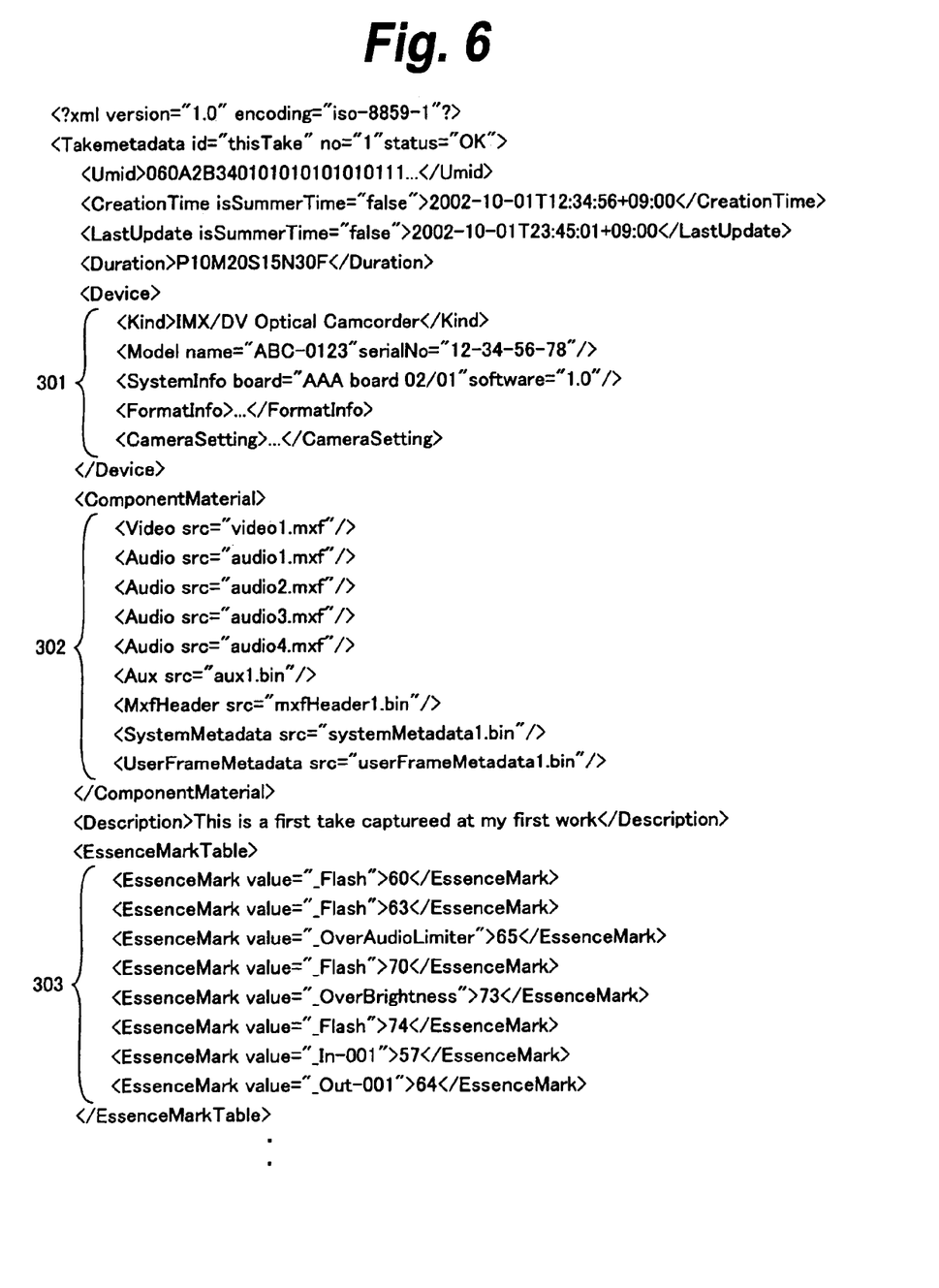
FIG. 6 is a schematic diagram describing an example of a Take Meta Data File.

FIG. 6 shows an example of a description of a Take Meta Data File. According to this embodiment, a Take Meta Data File is described with the extensible markup language (XML). The XML is a language that describes information with tags that can be originally defined. With the XML, tags allow described information to be specially defined. Since the XML allows each tag of an XML file to contain parameters that have meaning, new parameters can be easily defined. Thus, the XML has high expansibility.

Next, tags of XML files will be described in brief. Generally, tags are composed of a pair of symbols that represent the beginning and end of a range. Tags can be embedded in a text. For example, a tag that represents the beginning of a range is described by surrounding a pre-defined character string with a pair of symbols "<" and ">" (this pair is called a beginning tag). A tag that represents the end of the range is described by surrounding the same character string with a pair of symbols "</" and ">" (this pair is called an end tag). In a range surrounded by a pair of tags, any meaning can be defined with a character string surrounded by a pair of symbols "<" and ">" (or a pair of symbols "</" and ">"). In addition, predetermined parameters can be described in tags. Tags can be nested. In an XML file, nest levels are represented with the depths of indents.

As shown in FIG. 6, a Take Meta Data File contains at least a video information portion 301, a video file name portion 302, and a mark portion 303. The video information portion 301 is video information of the video camera device 1. The video file name portion 302 is a file name of a content data file such as a digital image signal and a digital audio signal. The mark portion 303 is an electronic mark data. Definition names in tags are not limited to those shown in FIG. 6. Alternatively, other definition names may be used.

The video information portion 301 is defined between a tag "<Device>" and a "tag </Device>." For example, a tag "<Model name="ABC-0123" serial No="12-34-56-78">" defines a model name of the video camera device 1. The video file name portion 302 defined between a tag "<ComponentMaterial>" and a tag "</ComponentMaterial>." For example, a file name "video1.mxf" of a digital image signal file of a content data file is defined as a tag "<Video src="video1.mxf">. A file name "audio1.mxf" of a digital audio signal file is defined as a tag <Audio.src="audio1.mxf">where ".mxf" represents that the format of these files is based on "material exchange format."

The mark portion 303 is defined between a tag "<EssenceMarkTable>" and a tag "</EssenceMarkTable>" as electronic mark data and time information corresponding thereto. In a tag "<EssenceMark value ="_XXXXXX">", a portion that is surrounded by double quotation marks ""describes an item name of electronic mark data. As shown in FIG. 4, an underscore "_" is immediately followed by a character string that clearly represents the content (for example "Flash," "WhiteBalanceChange," and so forth). Time information corresponding to electronic mark data is defined between a tag "<EssenceMark value=""_XXXXXX"> and a tag "/EssenceMark."

In FIG. 6, a frame number of a digital image signal is used as time information. However, time information may be real time information that includes date and time information.

Figure 7:
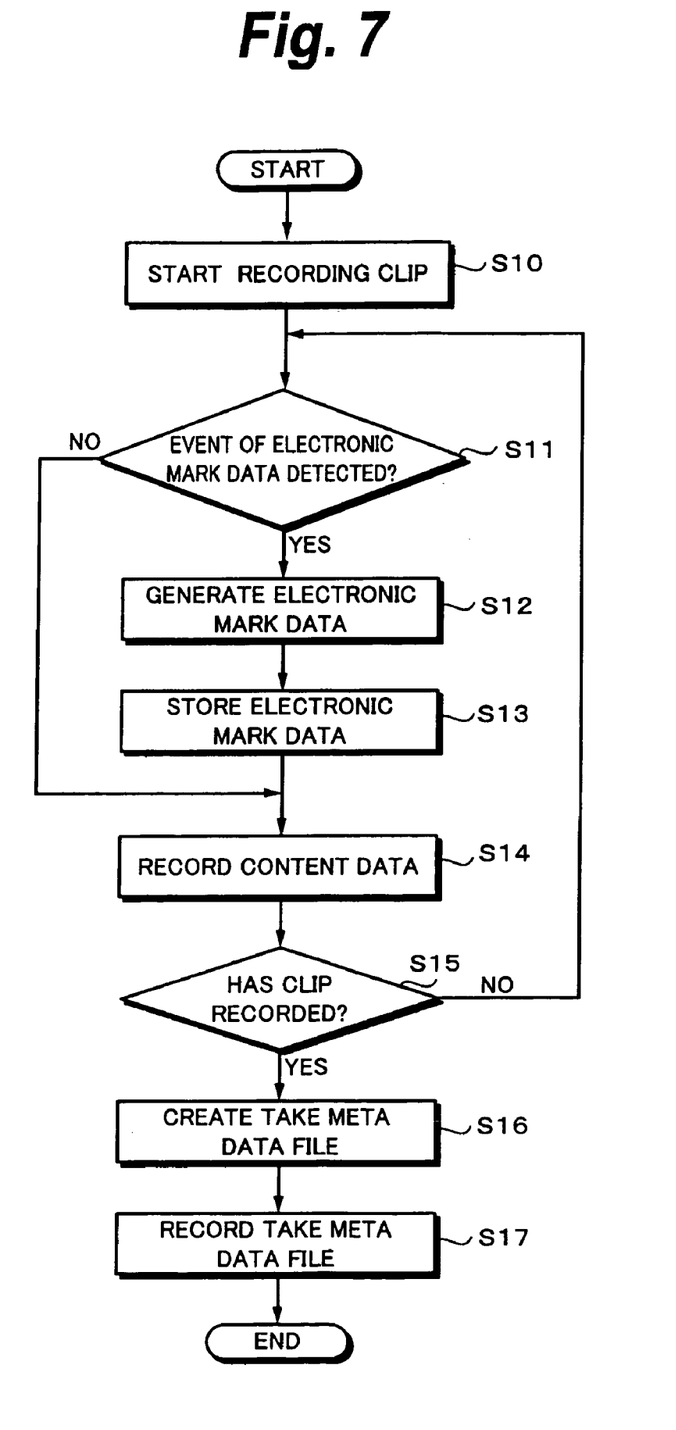
FIG. 7 is a flow chart showing an example of a method of generating a Take Meta Data File.

FIG. 7 is a flow chart showing an example of a generation method of a Take Meta Data File. When the video camera device 1 starts shooting a clip (at step S10), it is determined whether an event for electronic mark data has been detected (at step S11). When the determined result represents that an event for electronic mark data has been detected, the flow advances to step S12. At step S12, electronic mark data corresponding to the event is generated. At step S13, the electronic mark data generated at step S12 is stored in a memory or the like.

When the shutter speed is changed on the shutter selection menu 23, shutter control information is supplied to the electronic mark data generation circuit 40. The electronic mark data generation circuit 40 generates corresponding electronic mark data. The electronic mark data composed of a reserved word for a change of the shutter speed (for example "_ShutterSpeedChange" in FIG. 4) and time information of change detection time that are correlated and stored in a memory or the like. In addition, the shutter control information is also supplied to the auto white balance circuit 14. The auto white balance circuit 14 generates indoor/outdoor change information corresponding to a change of the shutter speed. The indoor/outdoor change information is supplied to the white balance change detection circuit 16. The white balance change detection circuit 16 generates electronic mark data that represent a change of the white balance. The electronic mark data are composed of a reserved word for a change of the white balance (for example "_WhiteBalanceChange" shown in FIG. 4) and time information of change detection time that are correlated and stored in the memory or the like.

At step S14, content data of a digital image signal and a digital audio signal are recorded to the disc 100. At step S15, it is determined whether the content data have been recorded to the disc 100. When the content data have not been recorded, the flow returns to step S11. In the real system, the electronic mark data generation process at steps S11 to S13 and the content data record process at step S14 are performed in parallel. Thus, while content data are being recorded, electronic mark data are generated and stored.

When it has been determined that a clip has been recorded, the flow advances to step S16. With electronic mark data stored in the memory in the process from step S11 to step S13, a Take Meta Data File is created. At step S17, the Take Meta Data File is recorded to the recording medium.

Figure 8:
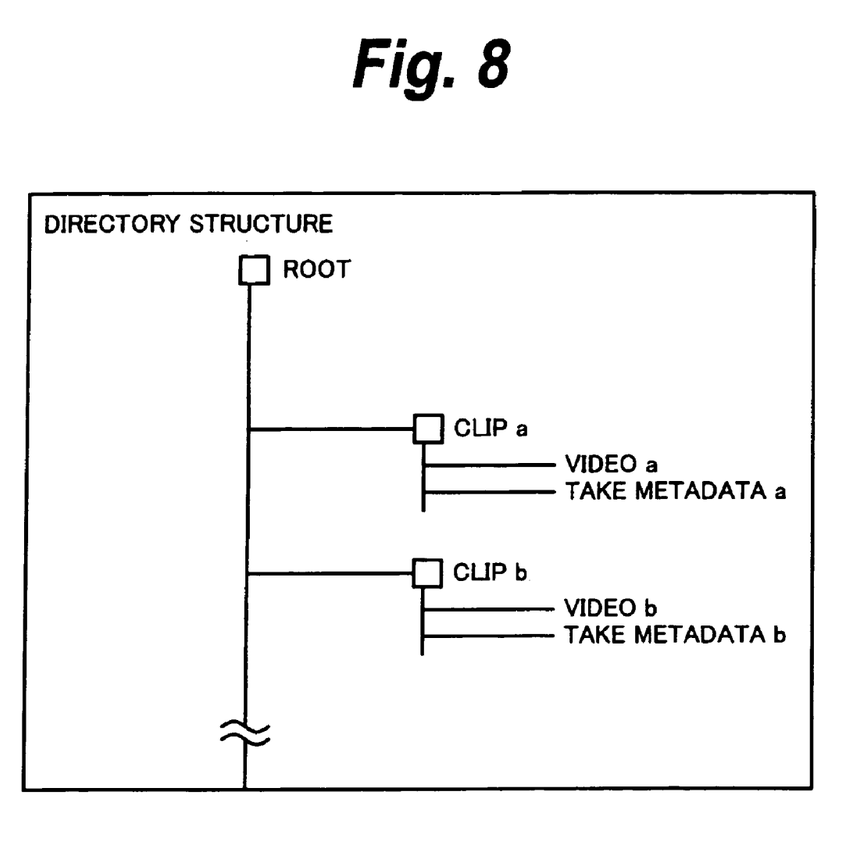
FIG. 8 is a schematic diagram showing the data management structure of an optical disc according to an embodiment of the present invention.

FIG. 8 schematically shows a data management structure of the optical disc 100 according to an embodiment of the present invention. As shown in FIG. 8, on the optical disc 100, data are hierarchically managed with a directory structure. Under a directory "ROOT," directories for clips are created. Under the directory for clips, a file of a clip, namely at least a content data file of the clip and a Take Meta Data File of the clip, are recorded.

In the example shown in FIG. 8, under the directory "ROOT," directories "CLIP a," "CLIP b," and so forth for these clips are created. Under the directory "CLIP a," as a content data file of the clip, a digital image signal file "VIDEO a" and a Take Meta Data File "TAKE META DATA a" corresponding to the content data file are recorded. This relationship applies to the directories "CLIP b" and so forth.

Figure 9:
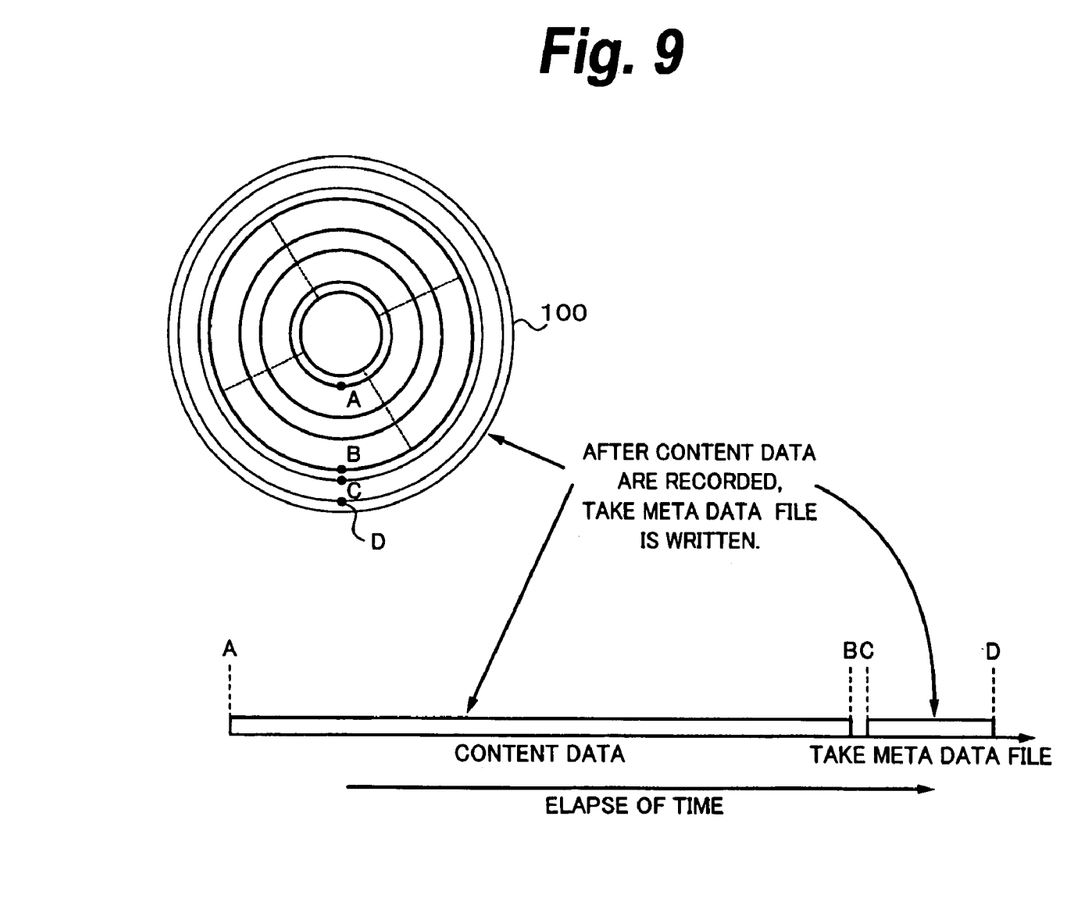
FIG. 9 is a schematic diagram showing an example of a method of recording content data and a Take Meta Data File to an optical disc.

FIG. 9 shows an example of the record method of content data and a Take Meta Data File to the optical disc 100. The optical disc 100 has a plurality of tracks as a record area. In FIG. 9, the plurality of tracks are concentrically illustrated. However, actually, the plurality of tracks are helically formed. Data are successively recorded to helical tracks from the center to the outer periphery of the optical disc 100.

At step S10 shown in FIG. 7, the recording of the clip is started. At step S14, content data are written from a position A on the optical disc 100. While data are present, the record point moves on helical tracks to the outer periphery side. When the clip has been recorded at step S15, the record point has moved to a position B on the optical disc. After the clip has been recorded, a Take Meta Data File is recorded to the optical disc 100 (at step S17). In the example shown in FIG. 9, the Take Meta Data File is recorded after a position C that is a later record position than the record end position B of the clip until a position D on the optical disc.

In the foregoing description, it was assumed that a Take Meta Data File is recorded on the outer periphery side of content data. However, a Take Meta Data File may be recorded on the inner periphery side of content data. In the foregoing description, after one content is recorded, take meta data corresponding thereto is recorded. After a plurality of files of content data are recorded, a plurality of Take Meta Data Files corresponding thereto may be recorded.

In the foregoing description, the recording medium on which a digital image signal is recorded is a recordable optical disc. However, the recording medium may be a magnetic tape, a semiconductor memory, etc.

It should be understood by those skilled in the art that various modifications, combinations, sub-combinations and alternations may occur depending on design requirements and other factors insofar as they are within the scope of the appended claims or the equivalents thereof.

Obviously, numerous modifications and variations of the present invention are possible in light of the above teachings. It is therefore to be understood that within the scope of the appended claims, the present invention may be practiced otherwise than as specifically described herein.

The invention claimed is:

1. An image sensing apparatus, comprising:
    an image sensor configured to sense an image of an object and to output an image signal corresponding to the image of the object;
    an auto white balance adjustment circuit configured to automatically adjust white balance of the image signal based on a change of the image signal;
    a change point detection circuit configured to detect a change point of the white balance based on at least an adjustment value of the white balance while said image sensor senses the image of the object;
    an electronic mark data generation circuit configured to generate electronic mark data for adjusted white balance based on time information of the change point detected by said change point detection circuit; and
    a recording circuit configured to record the image signal to a recording medium and to record the electronic mark data to a recording medium, correlating in time the electronic mark data to points in the image signal when the electronic mark data is recorded.

2. The image sensing apparatus as set forth in claim 1, wherein said change point detection circuit detects a change point of the white balance also based on information that represents that brightness of the object changed while said image sensor senses the image of the object.

3. The image sensing apparatus as set forth in claim 2, further comprising:
    a shutter speed control circuit configured to control a shutter speed of said image sensing unit,
    wherein the information that represents that the brightness of the object changed is shutter control information of said shutter control circuit.

4. The image sensing apparatus as set forth in claim 2, further comprising:
    a diaphragm configured to restrain an optical path of the incident light that enters said image sensor.

5. The image sensing apparatus as set forth in claim 2, wherein said auto white balance adjustment circuit controls a follow-up speed that follows the change of the image signal corresponding to the information that represents that the brightness changed.

6. The image sensing apparatus as set forth in claim 1, wherein the time information is a frame number of the image signal.

7. The image sensing apparatus as set forth in claim 1, wherein said electronic mark data generation circuit is further configured to package electronic mark data generated after said image sensor issues a sensing start command until said image sensor unit issues a sensing end command.

8. The image sensing apparatus as set forth in claim 1, wherein the electronic mark data generated by said electronic mark data generation circuit is recorded to the same recording medium as the image signal along with the image signal.

9. The image sensing apparatus as set forth in claim 1, wherein the electronic mark data generated by said electronic mark data generation circuit is recorded or stored to a recording medium or a storing medium different from the recording medium for the image signal.

10. An image sensing method, comprising:
sensing an image of an object and outputting an image signal corresponding to the image of the object;
automatically adjusting white balance of the image signal corresponding to a change of the image signal;
detecting a change point of the white balance corresponding to at least an adjustment value of the white balance while the image of the object is being sensed at the image sensing;
generating electronic mark data for adjusted white balance based on time information of the change point detected at the detecting a change point; and
recording the image signal to a recording medium and recording the electronic mark data to a recording medium, correlating in time the electronic mark data to points in the image signal when the electronic mark data is recorded.

11. A computer readable medium storing computer executable instructions that cause a microprocessor to execute an image sensing method, comprising:
sensing an image of an object and outputting an image signal corresponding to the image of the object;
automatically adjusting white balance of the image signal corresponding to a change of the image signal;
detecting a change point of the white balance corresponding to at least an adjustment value of the white balance while the image of the object is being sensed at the image sensing;
generating electronic mark data for adjusted white balance based on time information of the change point detected at the detecting a change point; and
recording the image signal to a recording medium and recording the electronic mark data to a recording medium, correlating in time the electronic mark data to points in the image signal when the electronic mark data is recorded.

12. A recording method, comprising:
sensing an image of an object and outputting an image signal corresponding to the image of the object;
automatically adjusting white balance of the image signal corresponding to a change of the image signal;
detecting a change point of the white balance corresponding to at least an adjustment value of the white balance while the image of the object is being sensed at the image sensing;
generating electronic mark data for adjusted white balance based on time information of the change point detected at the detecting a change point; and
recording the image signal whose white balance has been adjusted at the automatically adjusting white balance to a recording medium and recording the generated electronic mark to a recording medium, correlating in time the electronic mark data to points in the image signal when the electronic mark data is recorded.

13. A computer readable medium storing computer executable instructions that cause a microprocessor to execute a recording method, comprising:
sensing an image of an object and outputting an image signal corresponding to the image of the object;
automatically adjusting white balance of the image signal corresponding to a change of the image signal;
detecting a change point of the white balance corresponding to at least an adjustment value of the white balance while the image of the object is being sensed at the image sensing;
generating electronic mark data for adjusted white balance based on time information of the change point detected at the detecting a change point; and
recording the image signal whose white balance has been adjusted at the automatically adjusting white balance to a recording medium and recording the generated electronic mark to a recording medium, correlating in time the electronic mark data to points in the image signal when the electronic mark data is recorded.

14. An image sensing apparatus, comprising:
means for sensing an image of an object and to output an image signal corresponding to the image of the object;
means for automatically adjusting white balance of the image signal based on a change of the image signal;
means for detecting a change point of the white balance based on at least an adjustment value of the white balance while said means for sensing is sensing the image of the object;
means for generating electronic mark data for adjusted white balance based on time information of the change point detected by said means for detecting a change point; and
means for recording the image signal to a recording medium and recording the electronic mark data to a recording medium, correlating in time the electronic mark data to points in the image signal when the electronic mark data is recorded.

15. The image sensing apparatus as set forth in claim 14, wherein said means for detecting a change point detects a change of white balance also corresponding to information that represents that brightness of the object changed while said means for sensing is sensing the image of the object.

16. The image sensing apparatus as set forth in claim 15, further comprising:
means for controlling a shutter speed of said means for sensing,
wherein the information that represents that the brightness of the object changed is shutter control information of said means for controlling shutter speed.

17. The image sensing apparatus as set forth in claim 15, further comprising:
means for restraining an optical path of the incident light that enters said means for sensing.

18. The image sensing apparatus as set forth in claim 15, wherein said means for automatically adjusting white balance controls a follow-up speed that follows the change of the image signal based on the information that represents that the brightness changed.

19. The image sensing apparatus as set forth in claim 14, wherein the time information is a frame number of the image signal.

20. The image sensing apparatus as set forth in claim 14, wherein said means for generating electronic mark data packages electronic mark data generated after said means for sensing issues a sensing start command until said means for sensing sensing issues a sensing end command.

21. The image sensing apparatus as set forth in claim 14, further comprising:
means for recording the image signal to a recording medium, wherein the electronic mark data generated by said means for generating electronic mark data is recorded to the recording medium along with the image signal.

22. The image sensing apparatus as set forth in claim 14, further comprising:

recording means for recording the image signal to a recording medium, wherein the electronic mark data generated by said means for generating electronic mark data is recorded or stored to a recording medium or a storing medium different from the recording medium for the image signal.

* * * * *